(12) United States Patent
Zhan

(10) Patent No.: US 9,287,967 B2
(45) Date of Patent: Mar. 15, 2016

(54) METHOD, APPARATUS, AND RADIO REMOTE UNIT FOR TRANSMITTING WIRELESS BASE BAND DATA

(71) Applicant: ZTE Corporation, Shenzhen, Guangdong (CN)
(72) Inventor: Jianming Zhan, Shenzhen (CN)
(73) Assignee: ZTE Corporation, Shenzhen, Guangdong (CN)
(*) Notice: Subject to any disclaimer, the term of this patent is extended or adjusted under 35 U.S.C. 154(b) by 0 days.
(21) Appl. No.: 14/763,762
(22) PCT Filed: Aug. 23, 2013
(86) PCT No.: PCT/CN2013/082222
§ 371 (c)(1),
(2) Date: Aug. 27, 2015
(87) PCT Pub. No.: WO2013/189431
PCT Pub. Date: Dec. 27, 2013
(65) Prior Publication Data
US 2015/0358073 A1 Dec. 10, 2015
(30) Foreign Application Priority Data

Jan. 29, 2013 (CN) .......................... 2013 1 0033743

(51) Int. Cl.
*H04L 25/03* (2006.01)
*H04B 7/24* (2006.01)
*H04B 1/04* (2006.01)
*H04L 12/413* (2006.01)
*H04W 88/08* (2009.01)
(Continued)

(52) U.S. Cl.
CPC ............. *H04B 7/24* (2013.01); *H04B 1/0475* (2013.01); *H04L 12/413* (2013.01); *H04W 88/085* (2013.01)

(58) Field of Classification Search
CPC ............................ H04B 7/24; H04L 1/0475
See application file for complete search history.

(56) References Cited

U.S. PATENT DOCUMENTS

| 2011/0134972 | A1 | 6/2011 | Zhu | |
|---|---|---|---|---|
| 2014/0064726 | A1* | 3/2014 | Cucala Garcia . | H04B 10/25752 398/45 |
| 2015/0245332 | A1* | 8/2015 | Chakrabarti ......... | H04W 4/008 370/329 |

FOREIGN PATENT DOCUMENTS

| CN | 101321010 A | 12/2008 |
|---|---|---|
| CN | 101931540 A | 12/2010 |

(Continued)

OTHER PUBLICATIONS

International Search Report in international application No. PCT/CN2013/082222, mailed on Nov. 28, 2013.
English Translation of the Written Opinion of the International Search Authority in international application No. PCT/CN2013/082222, mailed on Nov. 28, 2013.
(Continued)

*Primary Examiner* — Dac Ha
(74) *Attorney, Agent, or Firm* — Oppedahl Patent Law Firm LLC

(57) ABSTRACT

Disclosed is a method for transmitting wireless base band data, comprising: receiving a downlink base band signal transmitted by a base band processing unit (BBU), processing the downlink base band signal to module the downlink base band signal into a downlink intermediate frequency analog signal, and outputting the downlink intermediate frequency analog signal to an Ethernet cable; obtaining, from the Ethernet cable, an uplink intermediate frequency analog signal which is detected and fed back, and processing the uplink intermediate frequency analog signal; and taking the processed uplink intermediate frequency analog signal as a feedback input of digital pre-distortion (DPD), obtaining an intermediate frequency analog signal from the Ethernet cable, converting the intermediate frequency analog signal into an uplink base band signal, and sending the uplink base band signal to the BBU. Embodiments of the present invention also provide a corresponding apparatus and radio remote unit (RRU) for transmitting wireless base band data. By adopting the solutions disclosed in the embodiments of the present invention, transmission of a wireless base band signal between a BBU and an RRU can be implemented through an Ethernet signal+an intermediate frequency signal+power over Ethernet (EIP) device, thereby avoiding a high network deployment cost caused by the need of laying down an optical fiber or a microwave transmission network again.

20 Claims, 8 Drawing Sheets

(56) References Cited

FOREIGN PATENT DOCUMENTS

| CN | 102186265 A | 9/2011 |
|---|---|---|
| CN | 102208940 A | 10/2011 |
| EP | 1827036 A1 | 8/2007 |
| EP | 2299774 A1 | 3/2011 |

OTHER PUBLICATIONS

Supplementary European Search Report in European application number: 13806463.9, mailed on Jan. 7, 2016.

* cited by examiner

US 9,287,967 B2

METHOD, APPARATUS, AND RADIO REMOTE UNIT FOR TRANSMITTING WIRELESS BASE BAND DATA

TECHNICAL FIELD

The disclosure relates to a wireless communication technology and in particular, to a method, an apparatus, and a Radio Remote Unit (RRU) for transmitting wireless base band data.

BACKGROUND

In 3GPP GSM/UMTS/LTE wireless access systems, a mode of networking using a distributed building Base Band Unit (BBU) and a RRU has been very popular in terms of application. The band IQ data is transmitted between the BBU and the RRU. The transmission rate of the band IQ data is required to be 1.2288 Gbps or 2.4576 Gbps, which depends on the carrier capacity. In order to meet the high transmission rate of the band IQ data, the optical fiber or the microwave device with high frequency and wide bandwidth is currently utilized in the art. Both of the transmission methods, however, require the operator to re-lay the optical fiber or the microwave transmission network, thereby resulting in the high cost of the network deployment.

SUMMARY

In view of the above problem, an embodiment of the disclosure provides a method, an apparatus, and a RRU for transmitting wireless base band data, which is intended to avoid the high cost of the network deployment caused by re-laying the optical fiber or the microwave transmission network.

According to an embodiment of the present disclosure, a method for transmitting wireless base band data is provided, which includes:

receiving a downlink base band signal transmitted by a BBU, processing the downlink base band signal to modulate it to a downlink intermediate frequency analog signal and outputting the downlink intermediate frequency analog signal to an Ethernet cable;

detecting, on the Ethernet cable, a fed back uplink intermediate frequency analog signal and processing the uplink intermediate frequency analog signal; and taking the processed uplink intermediate frequency analog signal as a feedback input of DPD (Digital PreDistortion), obtaining an intermediate frequency analog signal from the Ethernet cable, converting the intermediate frequency analog signal into an uplink base band signal and outputting it to the BBU.

Preferably, the uplink intermediate frequency analog signal is obtained by performing, by the RRU, up conversion on the downlink intermediate frequency analog signal obtained from the Ethernet cable so as to obtain a radio frequency signal, amplifying the radio frequency signal, detecting the amplified radio frequency signal so as to obtain the detected radio frequency signal and performing down conversion on the detected radio frequency signal.

Preferably, the step of processing the downlink base band signal to modulate it to a downlink intermediate frequency analog signal includes:

performing digitalized up conversion on the downlink base band signal so as to convert it to the downlink intermediate frequency digital signal; and performing peak clipping, digital pre-distortion and digital-to-analog conversion on the downlink intermediate frequency digital signal to modulate it to the downlink intermediate frequency analog signal.

Preferably, the step of taking the processed uplink intermediate frequency analog signal as a feedback input of DPD, obtaining an intermediate frequency analog signal from the Ethernet cable, and converting the intermediate frequency analog signal into an uplink base band signal includes:

filtering the uplink intermediate frequency analog signal by a band-pass filter and performing analog-to-digital conversion on the filtered uplink intermediate frequency analog signal so as to obtain the uplink intermediate frequency digital signal; and performing down conversion on the uplink intermediate frequency digital signal to convert it to the uplink base band signal.

Preferably, after receiving the downlink base band signal transmitted by the BBU, the method further includes:

extracting a clock signal from the downlink base band signal and outputting it to the Ethernet cable so that the RRU obtains a reference clock signal by filtering the clock signal via a band-pass filter and outputs the reference clock signal to a phase-locked loop after the RRU receives the clock signal.

Preferably, at the same time of receiving the downlink base band signal transmitted by the BBU, the method further includes:

receiving an Ethernet signal transmitted via the Ethernet and outputting it to the Ethernet cable so that the RRU receives the Ethernet signal from the Ethernet cable so as to perform the Ethernet switching and output via an interface of a wireless local network.

According to an embodiment of the present disclosure, an apparatus for transmitting wireless base band data is provided, which includes:

a downlink base band signal processing module configured to receive a downlink base band signal transmitted by a BBU, process the downlink base band signal to modulate it to a downlink intermediate frequency analog signal and output the downlink intermediate frequency analog signal to an Ethernet cable;

an uplink intermediate frequency analog signal detecting and processing module configured to detect, on the Ethernet cable, a fed back uplink intermediate frequency analog signal and process the uplink intermediate frequency analog signal;

an uplink base band signal generation module configured to take the processed uplink intermediate frequency analog signal as a feedback input of DPD, obtain an intermediate frequency analog signal from the Ethernet cable, and convert the intermediate frequency analog signal into an uplink base band signal; and an uplink base band signal transmission module configured to transmit the uplink base band signal to the BBU.

Preferably, the uplink intermediate frequency analog signal detected by the uplink intermediate frequency analog signal detecting and processing module is obtained by performing, by the RRU, up conversion on the downlink intermediate frequency analog signal obtained from the Ethernet cable so as to obtain a radio frequency signal, amplifying the radio frequency signal, detecting the amplified radio frequency signal so as to obtain the detected radio frequency signal and performing down conversion on the detected radio frequency signal.

Preferably, the downlink base band signal processing module includes:

an up conversion processing unit configured to perform digitalized up conversion on the downlink base band signal and converting it to the downlink intermediate frequency digital signal; and a modulation unit configured to perform peak clipping, digital pre-distortion and digital-to-analog conversion on the downlink intermediate frequency digital signal to modulate it into the downlink intermediate frequency analog signal.

Preferably, the uplink base band signal generation module includes:

an uplink intermediate frequency digital signal generation unit configured to filter the uplink intermediate frequency analog signal by a band-pass filter and perform analog-to-digital conversion on the filtered uplink intermediate frequency analog signal so as to obtain the uplink intermediate frequency digital signal; and a down conversion processing unit configured to perform down conversion on the uplink intermediate frequency digital signal to convert it to the uplink base band signal.

Preferably, the apparatus further includes:

a clock signal extraction and output module configured to extract a clock signal from the downlink base band signal and output it to the Ethernet cable so that the RRU obtains a reference clock signal by filtering the received clock signal via a band-pass filter and outputs the reference clock signal to a phase-locked loop after the RRU receives the clock signal.

Preferably, the apparatus further includes:

an Ethernet signal output module configured to receive an Ethernet signal transmitted via the Ethernet and output it to the Ethernet cable so that the RRU receives the Ethernet signal from the Ethernet cable so as to perform the Ethernet switching and output via a cascaded Ethernet port.

Preferably, the apparatus further includes:

a Power Sourcing Equipment (PSE) and Ethernet switching module configured to supply current and voltage for the Ethernet cable and supply power for the RRU at the remote end.

In practice, the up conversion processing unit in the downlink base band signal processing module may be implemented by a frequency converter in the apparatus for transmitting wireless base band data. The modulation unit in the downlink base band signal processing module may be implemented by a modem in the apparatus for transmitting wireless base band data.

The uplink intermediate frequency analog signal detecting and processing module may be implemented by a Central Processing Unit (CPU), a Digital Signal Processor (DSP), or a Field Programmable Gate Array (FPGA) in the apparatus for transmitting wireless base band data.

The uplink intermediate frequency digital signal generation unit in the uplink base band signal generation module may be implemented by a digital signal generator in the apparatus for transmitting wireless base band data. The down conversion processing unit in the uplink base band signal generation module may be implemented by frequency converter in the apparatus for transmitting wireless base band data.

The uplink base band signal transmission module may be implemented by a transmitter in the apparatus for transmitting wireless base band data.

The clock signal extraction and output module may be implemented by a CPU, a DSP or a FPGA in the apparatus for transmitting wireless base band data.

The Ethernet signal output module may be implemented by an Ethernet controller in the apparatus for transmitting wireless base band data.

The Power Sourcing Equipment (PSE) and Ethernet switching module may be implemented by a power supply and an Ethernet controller in the apparatus for transmitting wireless base band data.

According to an embodiment of the present disclosure, a RRU is provided, which includes:

a downlink signal processing sub-module configured to obtain a downlink intermediate frequency analog signal from an Ethernet cable, convert the downlink intermediate frequency analog signal into a downlink radio frequency signal, and output the converted downlink radio frequency signal through a port of an antenna;

an uplink signal processing sub-module configured to receive the feedback uplink radio frequency signal from the port of the antenna, convert it to an uplink intermediate frequency analog signal and output it to the Ethernet cable; and a downlink signal detection and feedback sub-module configured to detect the downlink radio frequency signal, performing down conversion on the detected downlink radio frequency signal to obtain the uplink intermediate frequency analog signal and output it to the Ethernet cable.

Preferably, the downlink signal processing sub-module includes:

an acquisition unit configured to obtain the downlink intermediate frequency analog signal, which is filtered by a band-pass filter, from the Ethernet cable;

an up conversion processing unit configured to up convert the filtered downlink intermediate frequency analog signal so as to convert it to the downlink radio frequency signal; and an amplification and output unit configured to amplify the downlink radio frequency signal via the power amplifier, filter the amplified downlink radio frequency signal via the duplexing filter and output it to the port of the antenna.

Preferably, the uplink signal processing sub-module is further configured to receive the feedback uplink radio frequency signal from the port of the antenna, convert it to the uplink intermediate frequency analog signal via filtering, low noise amplification and down conversion by a duplexing filter and output it to the Ethernet cable.

Preferably, the downlink signal detection and feedback sub-module includes:

a detection unit configured to detect the downlink radio frequency signal which is amplified by the power amplifier; and a down conversion processing and output unit configured to down convert the detected downlink radio frequency signal to the uplink intermediate frequency analog signal and output it to the Ethernet cable.

Preferably, the RRU further includes:

a clock acquisition sub-module configured to obtain a reference clock signal by filtering the downlink intermediate frequency analog signal obtained from the Ethernet cable by a band-pass filter and output the reference clock signal to a phase-locked loop.

Preferably, the RRU further includes:

a Wireless Local Area Network (WLAN) signal processing sub-module connected to an internal Ethernet switching module and configured to process the uplink and downlink Wireless Fidelity (WIFI) signals; and a control and monitoring sub-module connected to the internal Ethernet switching module and configured to maintain, control and monitor the RRU.

Preferably, the RRU further includes:

a Powered Device (PD) sub-module configured to extract the current and voltage from the Ethernet cable and supply power for all the active devices of the RRU.

In practice, the acquisition unit in the downlink signal processing sub-module may be implemented by an Ethernet transceiver in the RRU. The up conversion processing unit in the downlink signal processing sub-module may be implemented by a frequency converter in the RRU. The amplification and output unit in the downlink signal processing sub-module may be implemented by an amplifier and a filter in the RRU.

The detection unit in the downlink signal detection and feedback sub-module may be implemented by a radio frequency signal detector in the RRU. The down conversion processing and output unit in the downlink signal detection and feedback sub-module may be implemented by a frequency converter and a FPGA with signal output function in the RRU.

The clock acquisition sub-module may be implemented by a CPU, a DSP or a FPGA in the RRU.

The WLAN signal processing sub-module may be implemented by a WLAN router in the RRU.

The control and monitoring sub-module may be implemented by a CPU, a DSP or a FPGA in the RRU.

According to an embodiment of the present disclosure, an Ethernet signal+an intermediate frequency signal+power over Ethernet (EIP) device receives a downlink base band signal transmitted by a BBU, processes the downlink base band signal to modulate the downlink base band signal into a downlink intermediate frequency analog signal, and outputs the downlink intermediate frequency analog signal to an Ethernet cable. Then, an uplink intermediate frequency analog signal is obtained from the Ethernet cable, which is detected and fed back by a RRU according to the downlink radio frequency analog signal, and the uplink intermediate frequency analog signal is processed. The processed uplink intermediate frequency analog signal is taken as a feedback input of DPD. The uplink intermediate frequency analog signal is obtained from the Ethernet cable, and converted into an uplink base band signal, and then transmitted to the BBU. As such, the transmission of the wireless band base signal between the BBU and the RRU is implemented by the EIP device, therefore avoiding the high cost of the network deployment caused by re-laying the optical fiber or microwave transmission network.

DETAILED DESCRIPTION

It should be understood that the embodiments described herein are only used for explaining the disclosure, not for limiting the disclosure.

An embodiment of the disclosure provides a method for transmitting wireless base band data, which can be also used for transmitting Ethernet signals.

Figure 1:
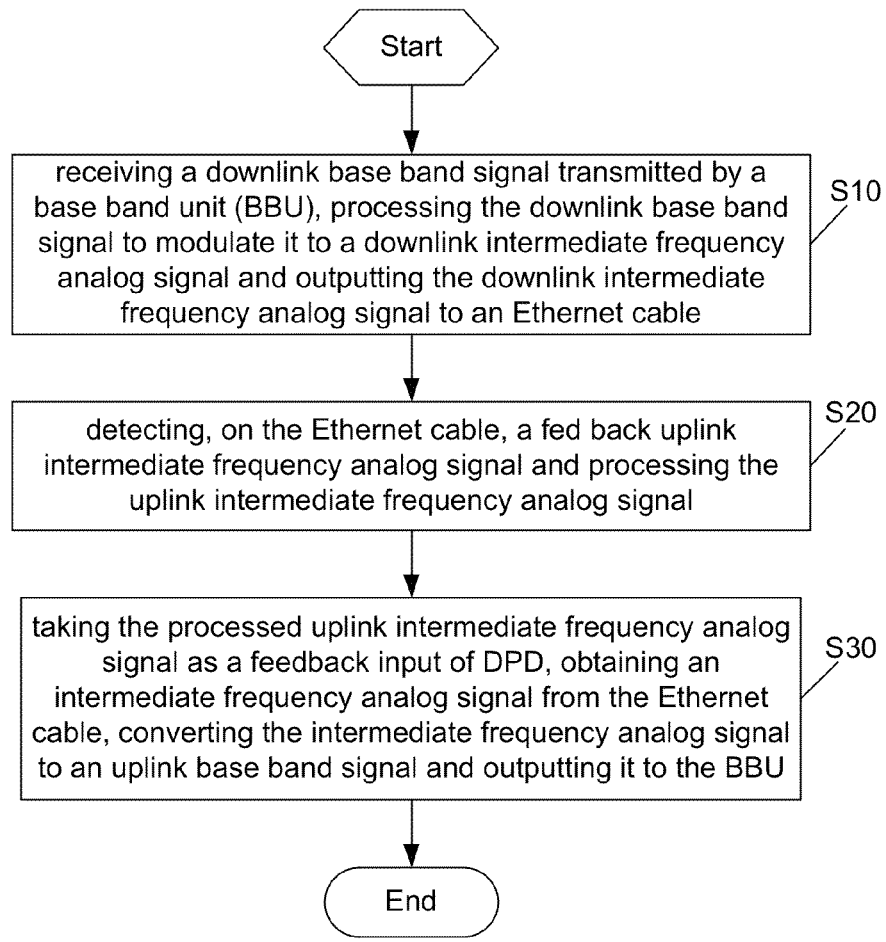
FIG. 1 is a schematic flowchart of the method for transmitting wireless base band data according to an embodiment of the disclosure.

Turning to FIG. 1, FIG. 1 is a schematic flowchart of the method for transmitting wireless base band data according to an embodiment of the disclosure.

The method for transmitting wireless base band data provided by the embodiment of the disclosure includes the following steps.

Step 10: receiving a downlink base band signal transmitted by a base band unit (BBU), processing the downlink base band signal to modulate it to a downlink intermediate frequency analog signal and outputting the downlink intermediate frequency analog signal to an Ethernet cable.

In this embodiment, an EIP device is provided between the BBU and a RRU. The downlink base band data transmitted by the BBU is sent to a Common Public Radio Interface (CPRI) of the EIP device through a cable or an optic fiber. According to the requirements of actual deployment, a multi-channel optical fiber of the BBU may be connected to one EIP device. Alternatively, the BBU may be connected to a plurality of EIP devices, wherein one channel optical fiber of the BBU is connected to one EIP device. In addition, a down Ethernet port of a Layer2 Ethernet switch may be connected to an up Ethernet port of the EIP device and a down Ethernet port of the EIP device may be connected to a RRU at a remote end through a CAT5E/6 Ethernet cable. Furthermore, the RRU may cascade with a series of Ethernet terminal devices along one channel.

The downlink base band data from the BBU is inputted to the CPRI of the EIP device, and then is cached in a base band data transceiver processing and RRU monitoring module after photoelectric conversion. The EIP device extracts and processes the downlink base band signal. Specifically, the EIP device modulates the downlink low-frequency base band signal into a downlink intermediate frequency analog signal. Then, the EIP device outputs the modulated downlink intermediate frequency analog signal to the Ethernet cable through which the signal is transmitted for receipt of the RRU.

Step 20: detecting, on the Ethernet cable, a fed back uplink intermediate frequency analog signal and processing the uplink intermediate frequency analog signal.

The downlink intermediate frequency analog signal outputted to the Ethernet cable from the EIP device is transmitted through the port of the Ethernet cable and received by the RRU via the corresponding port. The downlink intermediate frequency analog signal is further processed and outputted to the corresponding antenna. In this embodiment, after receiving the downlink intermediate frequency analog signal, the RRU converts the downlink intermediate frequency analog signal into a radio signal via up conversion, amplifies the radio signal via a power amplifier and outputs it to the antenna via a duplexing filter.

In the uplink, the RRU performs the coupling detection on the radio signal amplified by the power amplifier and down converts the radio signal which is subject to the coupling detection so as to convert it into the uplink intermediate frequency analog signal. Further, the RRU outputs the uplink intermediate frequency analog signal to the corresponding port of the Ethernet cable for transmission. Thus, the EIP device can obtain, from the Ethernet cable, the uplink intermediate frequency analog signal which is detected and fed back by the RRU.

Step 30: taking the processed uplink intermediate frequency analog signal as a feedback input of DPD, obtaining an intermediate frequency analog signal from the Ethernet cable, converting the intermediate frequency analog signal to an uplink base band signal and outputting it to the BBU.

After obtaining the uplink intermediate frequency analog signal returned by the RRU, the EIP device further processes the uplink intermediate frequency analog signal, takes the processed uplink intermediate frequency analog signal as a feedback input of DPD, obtains an intermediate frequency analog signal from the Ethernet cable, converts the intermediate frequency analog signal into a low frequency base band signal (i.e., an uplink base band signal) and outputs the converted uplink base band signal to the BBU. Therefore, the transmission of the wireless band base signal between the BBU and the RRU is implemented.

According to the embodiment of the present disclosure, the downlink base band signal transmitted by the BBU is received by the EIP device. The downlink base band signal is further processed and converted into the downlink intermediate frequency analog signal and then outputted to the Ethernet cable. Then, the uplink intermediate frequency analog signal is obtained from the Ethernet cable, which is fed back by the RRU according to the detection on the downlink radio analog signal. The fed-back uplink intermediate frequency analog signal is processed and taken as the feedback input of DPD. The uplink intermediate frequency analog signal obtained from the Ethernet cable is processed and converted into the uplink base band signal. The uplink base band signal is transmitted to the BBU. Thus, the transmission of the wireless band base signal between the BBU and the RRU is implemented by the EIP device, therefore avoiding the high cost of the network deployment caused by re-laying the optical fiber or the microwave transmission network.

Figure 2:
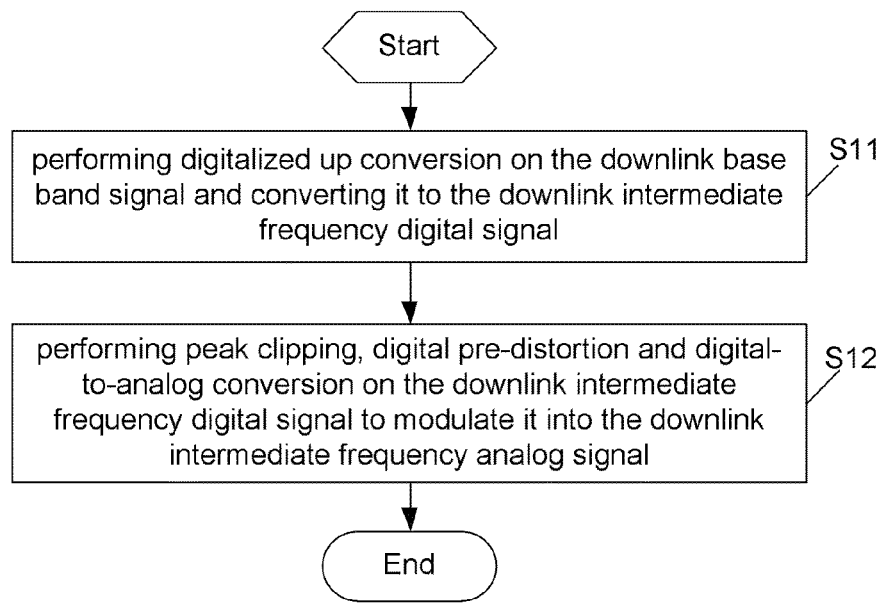
FIG. 2 is schematic flowchart of the step of modulating the downlink base band signal to the downlink intermediate frequency analog signal in the method for transmitting wireless base band data according to an embodiment of the disclosure.

Turning to FIG. 2, FIG. 2 is schematic flowchart of the step of modulating the downlink base band signal to the downlink intermediate frequency analog signal in the method for transmitting wireless base band data according to an embodiment of the disclosure.

In the above embodiment, Step 10 includes the following steps.

Step 11: performing digitalized up conversion on the downlink base band signal and converting it to the downlink intermediate frequency digital signal.

Step 12: performing peak clipping, digital pre-distortion and digital-to-analog conversion on the downlink intermediate frequency digital signal to modulate it into the downlink intermediate frequency analog signal.

After the EIP device extracts the downlink base band signal from the base band data transceiver processing and RRU monitoring module, the downlink base band signal is firstly processed through digitalized up conversion from the low frequency downlink base band signal to the downlink intermediate frequency digital signal. Then, the converted downlink intermediate frequency digital signal is processed through peak clipping, digital pre-distortion and digital-to-analog conversion and thus is modulated into the downlink intermediate frequency analog signal. The modulated downlink intermediate frequency analog signal is finally outputted to the port of the Ethernet cable for transmission and receipt by the RRU.

The downlink base band signal is firstly processed through digitalized up conversion from the low frequency downlink base band signal to the downlink intermediate frequency digital signal, and then the converted downlink intermediate frequency digital signal is processed through peak clipping, digital pre-distortion and digital-to-analog conversion and thus is modulated into the downlink intermediate frequency analog signal. Thus, it facilitates outputting to the port of the Ethernet cable for transmission and receipt by the RRU. As such, a precondition for transmitting the wireless base band signal from the BBU by the EIP device is provided.

Figure 3:
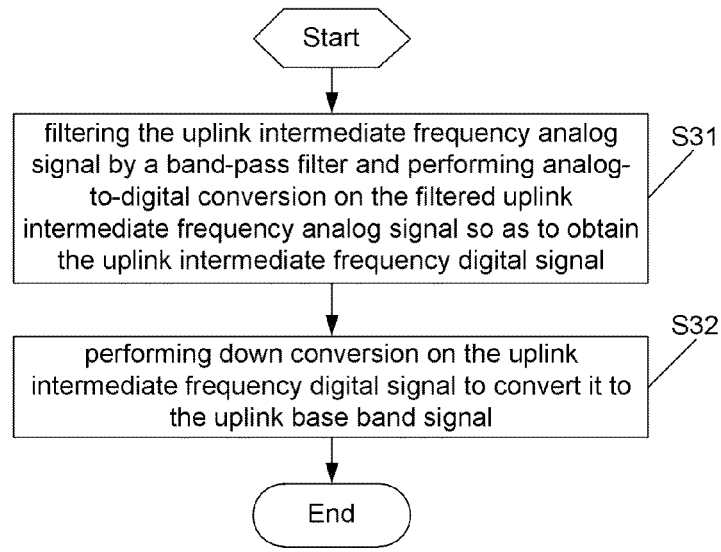
FIG. 3 is schematic flowchart of the step of converting the uplink intermediate frequency analog signal into an uplink base band signal in the method for transmitting wireless base band data according to an embodiment of the disclosure.

Turning to FIG. 3, FIG. 3 is schematic flowchart of the step of converting the uplink intermediate frequency analog signal into an uplink base band signal in the method for transmitting wireless base band data according to an embodiment of the disclosure.

In the above embodiment, Step 30 includes the following steps.

Step 31: filtering the uplink intermediate frequency analog signal by a band-pass filter and performing analog-to-digital conversion on the filtered uplink intermediate frequency analog signal so as to obtain the uplink intermediate frequency digital signal.

Step 32: performing down conversion on the uplink intermediate frequency digital signal to convert it to the uplink base band signal.

After the EIP device obtains the uplink intermediate frequency analog signal returned by the RRU from the Ethernet cable, the uplink intermediate frequency analog signal is filtered by the band-pass filter and then analog-to-digital converted to the uplink intermediate frequency digital signal. Then, the uplink intermediate frequency digital signal is processed by the down conversion to convert to the low frequency uplink base band signal. The converted uplink base band signal is finally sent to the BBU and thus the transmission of wireless base band signal between the BBU and the RRU is implemented.

The uplink intermediate frequency analog signal is filtered by the band-pass filter and is processed by analog-to-digital conversion to obtain the uplink intermediate frequency digital signal. Then, the uplink intermediate frequency digital signal is processed by the down conversion to convert to the uplink base band signal, which is sent to the BBU to implement the transmission of wireless base band signal between the BBU and the RRU. As such, the transmission of the wireless base band signal between the BBU and the RRU by the EIP device is guaranteed.

Figure 4:
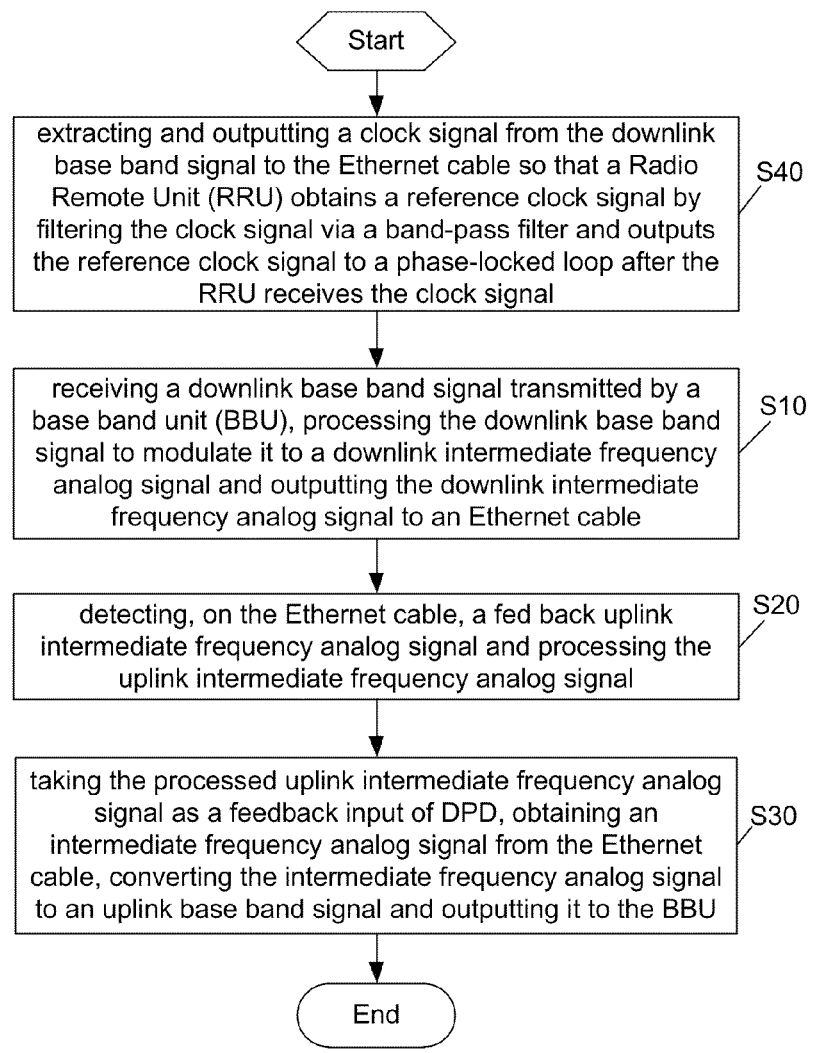
FIG. 4 is another schematic flowchart of the method for transmitting wireless base band data according to an embodiment of the disclosure.

Turning to FIG. 4, FIG. 4 is another schematic flowchart of the method for transmitting wireless base band data according to an embodiment of the disclosure.

Based on the above embodiment, after receiving a downlink base band signal transmitted by a BBU in Step 10, the method further includes the following step.

Step 40: extracting and outputting a clock signal from the downlink base band signal to the Ethernet cable so that the RRU obtains a reference clock signal by filtering the clock signal via a band-pass filter and outputs the reference clock signal to a phase-locked loop after the RRU receives the clock signal.

In this embodiment, after the EIP device receives the downlink base band signal transmitted from the BBU and caches it in the base band data transceiver processing and RRU monitoring module, the EIP device extracts the clock signal and outputs it to the corresponding port of the Ethernet cable for transmission. The RRU receives the clock signal from the port of the Ethernet cable and obtains the reference clock signal by filtering the clock signal via the band-pass filter. The reference clock signal is finally outputted into the phase-locked loop, which in turn provides a reference clock for the active devices in the RRU.

The clock signal is extracted from the downlink base band signal received by the EIP device and outputted to the Ethernet cable. The reference clock signal is obtained by filtering the clock signal via the band-pass filter which is received by the RRU. The reference clock signal is outputted into the phase-locked loop, which in turn provides a reference clock for the active devices in the RRU. As such, the functions of the EIP device are improved while the capacity of processing and transmitting data in the EIP device is guaranteed.

Figure 5:
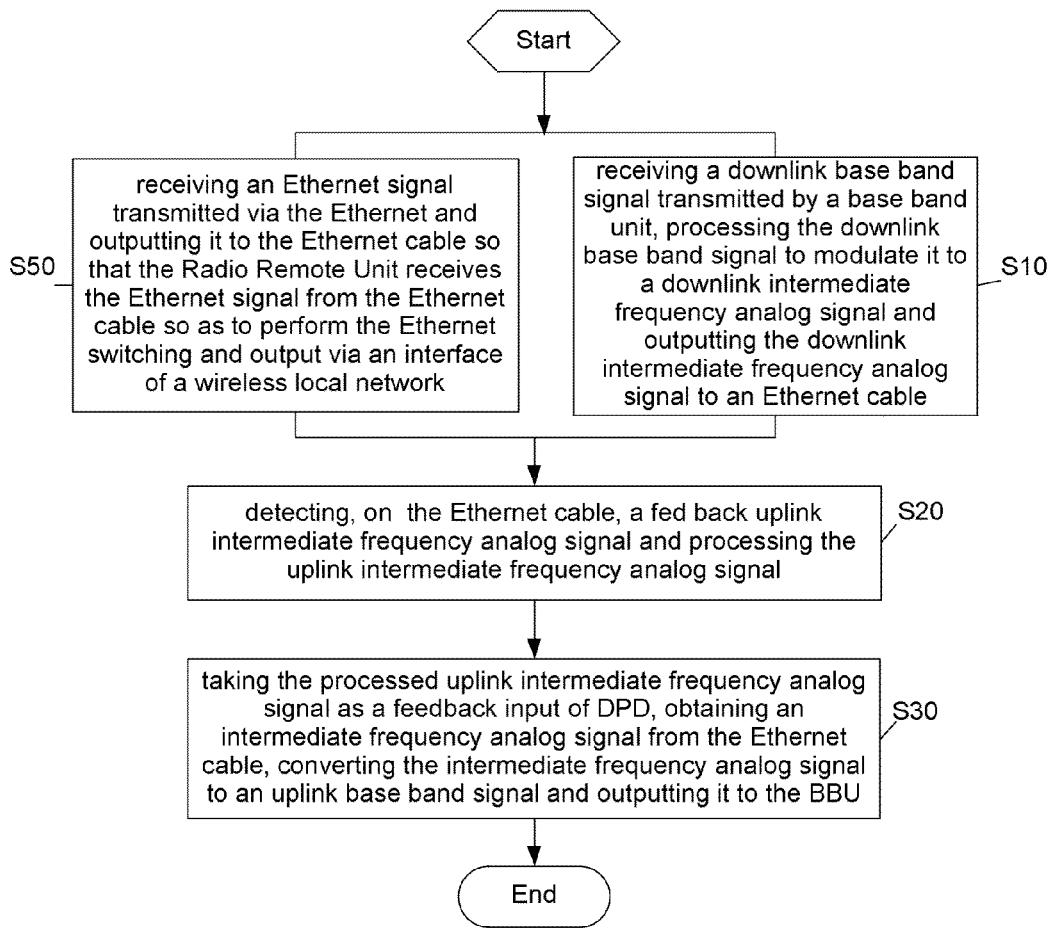
FIG. 5 is still another schematic flowchart of the method for transmitting wireless base band data according to an embodiment of the disclosure.

Turning to FIG. 5, FIG. 5 is still another schematic flowchart of the method for transmitting wireless base band data according to an embodiment of the disclosure.

Based on the above embodiment, at the same time of performing Step 10, the method further includes the following step.

Step 50: receiving an Ethernet signal transmitted via the Ethernet and outputting it to the Ethernet cable so that the RRU receives the Ethernet signal from the Ethernet cable so as to perform the Ethernet switching and output via an interface of a wireless local network.

In this embodiment, the EIP device also supports the function of Power over Ethernet (POE) which can supply power to the RRU. The Ethernet switching module is interconnected with the base band data transceiver processing and RRU monitoring module of the EIP device. The Ethernet switching module is up connected to the external switch.

At the same time of receiving the downlink base band signal transmitted from the BBU by the EIP device, the EIP device receives the Ethernet signal from the Ethernet and outputs the Ethernet signal to the Ethernet cable. The RRU receives the Ethernet signal from the Ethernet cable and then performs the Ethernet switching. Further, the switched signal is outputted to the other Ethernet terminal device outside connected via the built-in cascaded Ethernet port.

In this embodiment, after the EIP device outputs the Ethernet signal to the Ethernet cable, the Ethernet signal and the conditioned downlink intermediate frequency analog signal are transmitted via frequency division multiplexing on the Ethernet cable. In these two different standards of 1000Base T and 1000Base TX, a plurality of analog signals are transmitted on the same Ethernet cable in different frequencies. The Ethernet signal may be transmitted in a transmission frequency of 125 MHz on the Ethernet physical layer in the standard of 1000Base T interface while the wireless analog signal may be transmitted in a frequency range of 130 MHz~180 MHz, wherein the wireless analog signal may be multi-system wireless analog signal which is formed by combining a plurality of wireless systems. For example, the wireless analog signal may be a wireless analog signal conforming to two or three of Wideband Code Division Multiple Access (WCDMA), Global System for Mobile Communications (GSM) and Long Term Evolution (LTE). Alternatively, the wireless analog signal may be a wireless analog signal conforming to only one wireless system. The clock frequency is 61.44 MHz. These types of intermediate frequency analog wireless signals are separate in terms of frequency and thus can be transmitted on the same Ethernet cable at the same time.

At the same time of receiving the downlink base band signal transmitted from the BBU by the EIP device, the EIP device receives the Ethernet signal from the Ethernet and outputs the Ethernet signal to the Ethernet cable. The RRU receives the Ethernet signal from the Ethernet cable and then performs the Ethernet switching. Further, the switched signal is outputted via the cascaded Ethernet port. As such, the function of transmitting the Ethernet signal and the multi-system wireless base band signal at the same time by the EIP device is implemented.

An embodiment of the present disclosure also provides an apparatus for transmitting wireless base band data.

Figure 6:
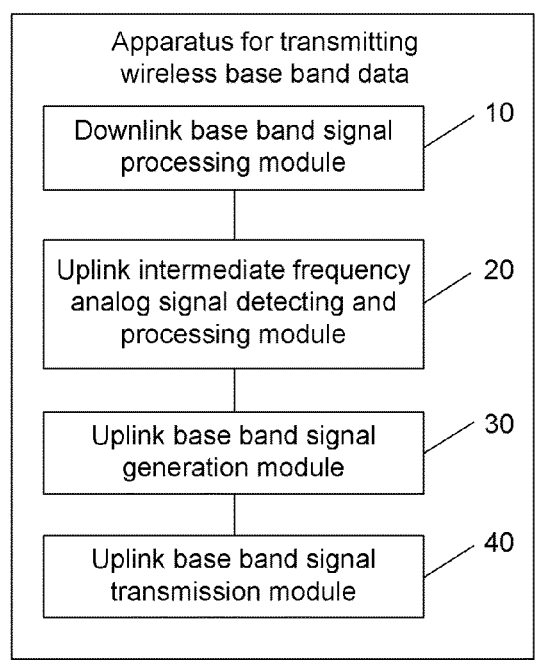
FIG. 6 is schematic structural diagram of an apparatus for transmitting wireless base band data according to an embodiment of the disclosure.

Turning to FIG. 6, FIG. 6 is schematic structural diagram of an apparatus for transmitting wireless base band data according to an embodiment of the disclosure.

The apparatus for transmitting wireless base band data provided by the embodiment of the disclosure includes the following modules.

A downlink base band signal processing module 10 is configured to receive a downlink base band signal transmitted by a BBU, process the downlink base band signal to modulate it to a downlink intermediate frequency analog signal and output the downlink intermediate frequency analog signal to an Ethernet cable.

An uplink intermediate frequency analog signal detecting and processing module 20 is configured to detect, on the Ethernet cable, a fed back uplink intermediate frequency analog signal and process the uplink intermediate frequency analog signal.

An uplink base band signal generation module 30 is configured to take the processed uplink intermediate frequency analog signal as a feedback input of DPD, obtain an intermediate frequency analog signal from the Ethernet cable, and convert the intermediate frequency analog signal into an uplink base band signal.

An uplink base band signal transmission module 40 is configured to transmit the uplink base band signal to the BBU.

In this embodiment, an EIP device is provided between the BBU and a RRU. The downlink base band data transmitted by the BBU is sent to a Common Public Radio Interface (CPRI) of the EIP device through a cable or an optic fiber. According to the requirements of actual deployment, a multi-channel optical fiber of the BBU may be connected to one EIP device. Alternatively, the BBU may be connected to a plurality of EIP devices, wherein one channel optical fiber of the BBU is connected to one EIP device. In addition, a down Ethernet port of a Layer2 Ethernet switch may be connected to an up Ethernet port of the EIP device and a down Ethernet port of the EIP device may be connected to a RRU at a remote end through a CAT5E/6 Ethernet cable. Furthermore, the RRU may cascade with a series of Ethernet terminal devices along one channel.

The downlink base band data from the BBU is inputted to the CPRI of the EIP device, and then is cached in the base band data transceiver processing and RRU monitoring module after photoelectric conversion. The EIP device extracts and the downlink base band signal. The downlink base band signal processing module 10 processes the downlink base band signal by modulating the downlink low-frequency base band signal into a downlink intermediate frequency analog signal and then outputting the modulated downlink intermediate frequency analog signal to the Ethernet cable through which the signal is transmitted for receipt of the RRU.

The downlink intermediate frequency analog signal outputted to the Ethernet cable from the EIP device is transmitted through the port of the Ethernet cable and received by the RRU via the corresponding port. The downlink intermediate frequency analog signal is further processed and outputted to the corresponding antenna. In this embodiment, after receiving the downlink intermediate frequency analog signal, the RRU converts the downlink intermediate frequency analog signal into a radio signal via up conversion, amplifies the radio signal via a power amplifier and outputs it to the antenna via a duplexing filter.

In the uplink, the RRU performs the coupling detection on the radio signal amplified by the power amplifier and down converts the radio signal which is subject to the coupling detection so as to convert it into the uplink intermediate frequency analog signal. Further, the RRU outputs the uplink intermediate frequency analog signal to the corresponding port of the Ethernet cable for transmission. Thus, the EIP device can obtain, from the Ethernet cable, the uplink intermediate frequency analog signal which is detected and fed back by the RRU via the uplink intermediate frequency analog signal detecting and processing module 20.

After obtaining the uplink intermediate frequency analog signal returned by the RRU, the uplink base band signal generation module 30 of the EIP device further processes the uplink intermediate frequency analog signal, takes the processed uplink intermediate frequency analog signal as a feedback input of DPD, obtains an intermediate frequency analog signal from the Ethernet cable, converts the intermediate frequency analog signal into a low frequency base band signal (i.e., an uplink base band signal) and outputs the converted uplink base band signal to the BBU via the uplink base band signal transmission module 40. Therefore, the transmission of the wireless band base signal between the BBU and the RRU is implemented.

According to the embodiment of the present disclosure, the downlink base band signal transmitted by the BBU is received by the EIP device. The downlink base band signal is further processed and modulated into the downlink intermediate frequency analog signal and then outputted to the Ethernet cable. Then, the uplink intermediate frequency analog signal is obtained from the Ethernet cable, which is fed back by the RRU according to the detection on the downlink radio analog signal. The fed-back uplink intermediate frequency analog signal is processed and taken as the feedback input of DPD. The uplink intermediate frequency analog signal obtained from the Ethernet cable is processed and converted into the uplink base band signal. The uplink base band signal is transmitted to the BBU. Thus, the transmission of the wireless band base signal between the BBU and the RRU is implemented by the EIP device, therefore avoiding the high cost of the network deployment caused by re-laying the optical fiber or microwave transmission network.

Figure 7:
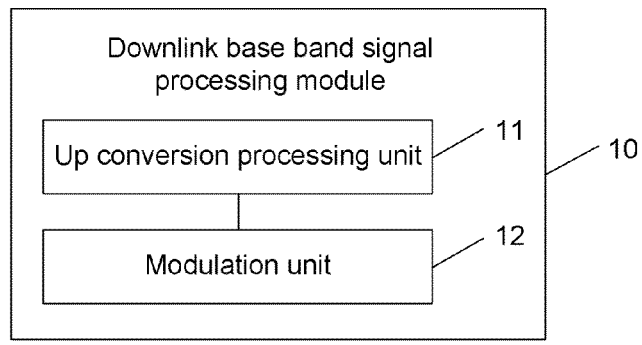
FIG. 7 is a schematic structural diagram of the downlink base band signal processing module in the apparatus for transmitting wireless base band data according to an embodiment of the disclosure.

Turning to FIG. 7, FIG. 7 is a schematic structural diagram of the downlink base band signal processing module in the apparatus for transmitting wireless base band data according to an embodiment of the disclosure.

In the above embodiment, the downlink base band signal processing module 10 includes the following units.

An up conversion processing unit 11 is configured to perform digitalized up conversion on the downlink base band signal and converting it to the downlink intermediate frequency digital signal.

A modulation unit 12 is configured to perform peak clipping, digital pre-distortion and digital-to-analog conversion on the downlink intermediate frequency digital signal to modulate it into the downlink intermediate frequency analog signal.

After the EIP device extracts the downlink base band signal from the base band data transceiver processing and RRU monitoring module, the downlink base band signal is firstly processed through digitalized up conversion via the up conversion processing unit 11 from the low frequency downlink base band signal to the downlink intermediate frequency digital signal. Then, the modulation unit 12 processes the converted downlink intermediate frequency digital signal by peak clipping, digital pre-distortion and digital-to-analog conversion and thus modulates it into the downlink intermediate frequency analog signal. The modulated downlink intermediate frequency analog signal is finally outputted to the port of the Ethernet cable for transmission and receipt by the RRU.

The downlink base band signal is firstly processed through digitalized up conversion from the low frequency downlink base band signal to the downlink intermediate frequency digital signal, and then the converted downlink intermediate frequency digital signal is processed through peak clipping, digital pre-distortion and digital-to-analog conversion and thus is modulated into the downlink intermediate frequency analog signal. Thus, it facilitates outputting to the port of the Ethernet cable for transmission and receipt by the RRU. As such, a precondition for transmitting the wireless base band signal from the BBU by the EIP device is provided.

Figure 8:
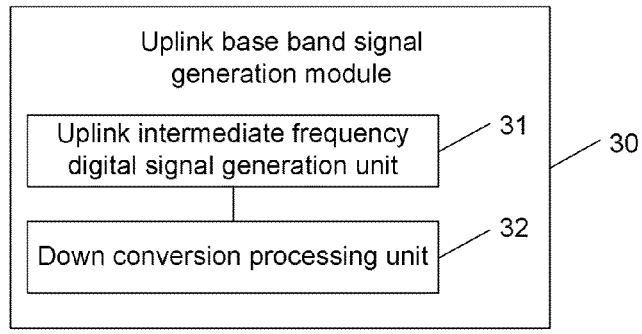
FIG. 8 is schematic structural diagram of the uplink base band generation module in the apparatus for transmitting wireless base band data according to an embodiment of the disclosure.

Turning to FIG. 8, FIG. 8 is schematic structural diagram of the uplink base band signal generation module in the apparatus for transmitting wireless base band data according to an embodiment of the disclosure.

In the above embodiment, the uplink base band signal generation module 30 includes the following units.

An uplink intermediate frequency digital signal generation unit 31 is configured to filter the uplink intermediate frequency analog signal by a band-pass filter and performing analog-to-digital conversion on the filtered uplink intermediate frequency analog signal so as to obtain the uplink intermediate frequency digital signal.

A down conversion processing unit 32 is configured to perform down conversion on the uplink intermediate frequency digital signal to convert it to the uplink base band signal.

After the EIP device obtains the uplink intermediate frequency analog signal returned by the RRU from the Ethernet cable, the uplink intermediate frequency digital signal generation unit 31 firstly filters the uplink intermediate frequency analog signal by the band-pass filter and then performs analog-to-digital conversion to obtain the uplink intermediate frequency digital signal. Then, the uplink intermediate frequency digital signal is processed by the down conversion processing unit 32 through the down conversion to convert it to the low frequency uplink base band signal. The converted uplink base band signal is finally sent to the BBU and thus the transmission of wireless base band signal between the BBU and the RRU is implemented.

The uplink intermediate frequency analog signal is filtered by the band-pass filter and is processed by analog-to-digital conversion to obtain the uplink intermediate frequency digital signal. Then, the uplink intermediate frequency digital signal is processed by the down conversion to convert to the uplink base band signal, which is sent to the BBU to implement the transmission of wireless base band signal between the BBU and the RRU. As such, the transmission of the wireless base band signal between the BBU and the RRU by the EIP device is guaranteed.

Figure 9:
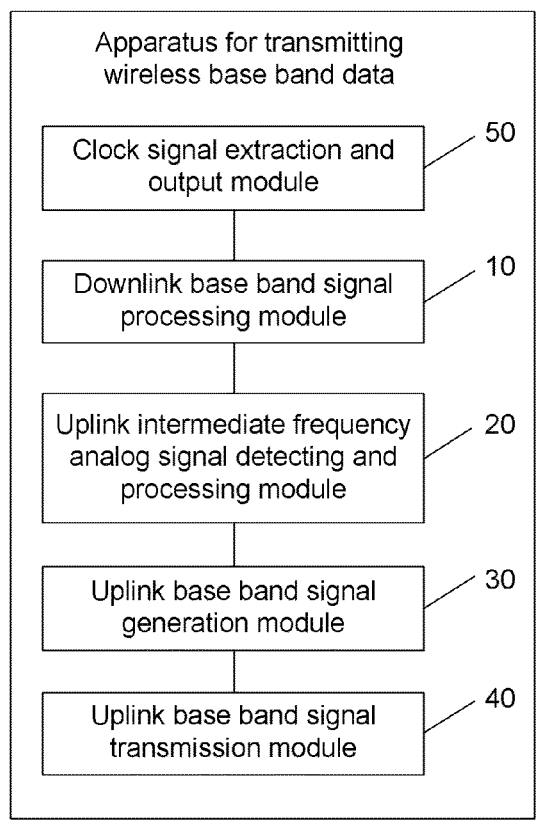
FIG. 9 is another schematic structural diagram of an apparatus for transmitting wireless base band data according to an embodiment of the disclosure.

Turning to FIG. 9, FIG. 9 is another schematic structural diagram of an apparatus for transmitting wireless base band data according to an embodiment of the disclosure.

Based on the above embodiment, the apparatus for transmitting wireless base band data further includes the following module.

A clock signal extraction and output module 50 is configured to extract a clock signal from the downlink base band signal and output it to the Ethernet cable so that the RRU obtains a reference clock signal by filtering the received clock signal via a band-pass filter and outputs the reference clock signal to a phase-locked loop after the RRU receives the clock signal.

In this embodiment, after the EIP device receives the downlink base band signal transmitted from the BBU and caches it in the base band data transceiver processing and RRU monitoring module, the clock signal extraction and output module 50 extracts the clock signal from the downlink base band signal and outputs it to the corresponding port of the Ethernet cable for transmission. The RRU receives the clock signal from the port of the Ethernet cable and obtains the reference clock signal by filtering the clock signal via the band-pass filter. The reference clock signal is finally outputted into the phase-locked loop, which in turn provides a reference clock for the active devices in the RRU.

The clock signal is extracted from the downlink base band signal received by the EIP device and outputted to the Ethernet cable. The reference clock signal is obtained by filtering the clock signal via the band-pass filter which is received by the RRU. The reference clock signal is outputted into the phase-locked loop, which in turn provides a reference clock for the active devices in the RRU. As such, the functions of the EIP device are improved while the capacity of processing and transmitting data in the EIP device is guaranteed.

Figure 10:
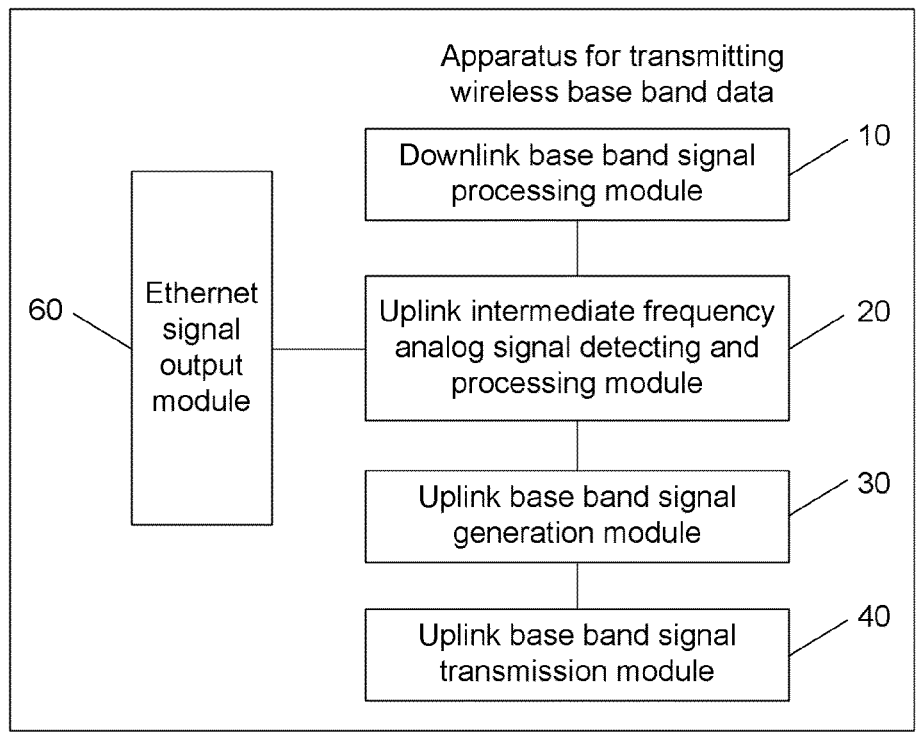
FIG. 10 is still another schematic structural diagram of an apparatus for transmitting wireless base band data according to an embodiment of the disclosure.

Turning to FIG. 10, FIG. 10 is still another schematic structural diagram of an apparatus for transmitting wireless base band data according to an embodiment of the disclosure.

Based on the above embodiment, the apparatus for transmitting wireless base band data further includes the following module.

An Ethernet signal output module 60 is configured to receive an Ethernet signal transmitted via the Ethernet and output it to the Ethernet cable so that the RRU receives the Ethernet signal from the Ethernet cable so as to perform the Ethernet switching and output via a cascaded Ethernet port.

In this embodiment, the EIP device also supports the function of Power over Ethernet (POE) of the Ethernet, which can supply power to the RRU. The Ethernet switching module is interconnected with the base band data transceiver processing and RRU monitoring module of the EIP device. The Ethernet switching module is up connected to the external switch.

At the same time of receiving the downlink base band signal transmitted from the BBU by the EIP device, the EIP device receives the Ethernet signal from the Ethernet and outputs the Ethernet signal to the Ethernet cable via the Ethernet signal output module 60. The RRU receives the Ethernet signal from the Ethernet cable and then performs the Ethernet switching. Further, the switched signal is outputted to the other Ethernet terminal device outside connected via the built-in cascaded Ethernet port.

In this embodiment, after the EIP device outputs the Ethernet signal to the Ethernet cable, the Ethernet signal and the conditioned downlink intermediate frequency analog signal are transmitted via frequency division multiplexing on the Ethernet cable. In these two different standards of 1000Base T and 1000Base TX, a plurality of analog signals are transmitted on the same Ethernet cable in different frequencies. The Ethernet signal may be transmitted in a transmission frequency of 125 MHz on the Ethernet physical layer in the standard of 1000Base T interface while the wireless analog signal may be transmitted in a frequency range of 130 MHz~180 MHz, wherein the wireless analog signal may be multi-system wireless analog signal which is formed by combining a plurality of wireless systems. For example, the wireless analog signal may be a wireless analog signal conforming to two or three of Wideband Code Division Multiple Access (WCDMA), Global System for Mobile Communications (GSM) and Long Term Evolution (LTE). Alternatively, the wireless analog signal may be a wireless analog signal conforming to only one wireless system. The clock frequency is 61.44 MHz. These types of intermediate frequency analog wireless signals are separate in terms of frequency and thus can be transmitted on the same Ethernet cable at the same time.

At the same time of receiving the downlink base band signal transmitted from the BBU by the EIP device, the EIP device receives the Ethernet signal from the Ethernet and outputs the Ethernet signal to the Ethernet cable. The RRU receives the Ethernet signal from the Ethernet cable and then performs the Ethernet switching. Further, the switched signal is outputted via the cascaded Ethernet port. As such, the function of transmitting the Ethernet signal and the multi-system wireless base band signal at the same time by the EIP device is implemented.

Figure 11:
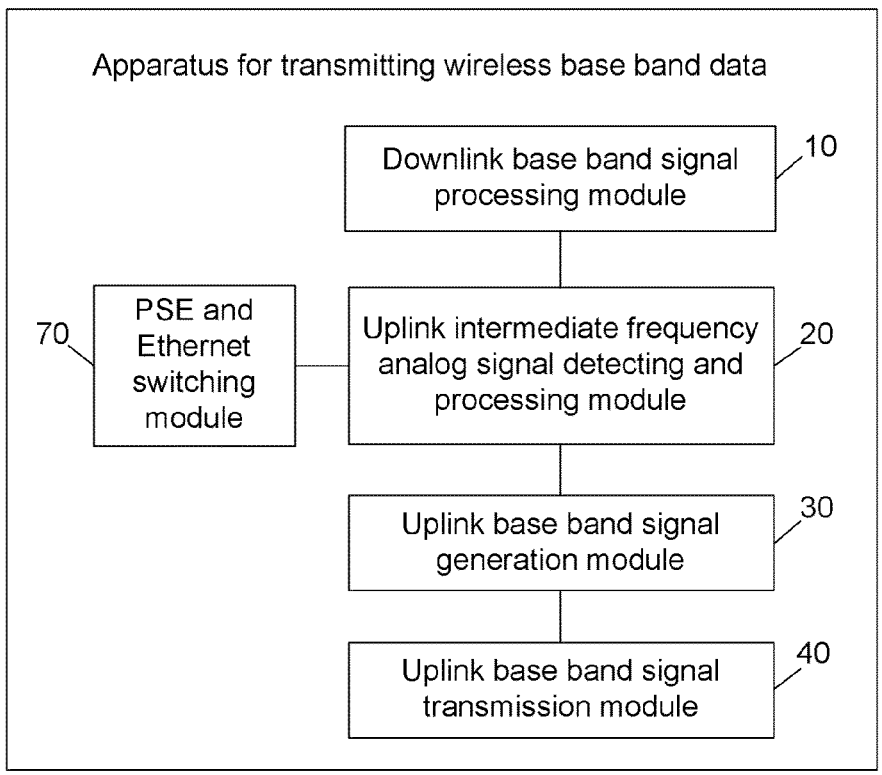
FIG. 11 is yet another schematic structural diagram of an apparatus for transmitting wireless base band data according to an embodiment of the disclosure.

Turning to FIG. 11, FIG. 11 is yet another schematic structural diagram of an apparatus for transmitting wireless base band data according to an embodiment of the disclosure.

Based on the above embodiment, the apparatus for transmitting wireless base band data further includes the following module.

A PSE and Ethernet switching module 70 is configured to supply current and voltage for the Ethernet cable and supply power for the RRU at the remote end.

In this embodiment, the apparatus for transmitting wireless base band data further includes the PSE and Ethernet switching module 70 configured to supply current and voltage for the Ethernet cable and supply power for the RRU at the remote end.

An embodiment of the present disclosure further provides a Radio Remote Unit (RRU).

Figure 12:
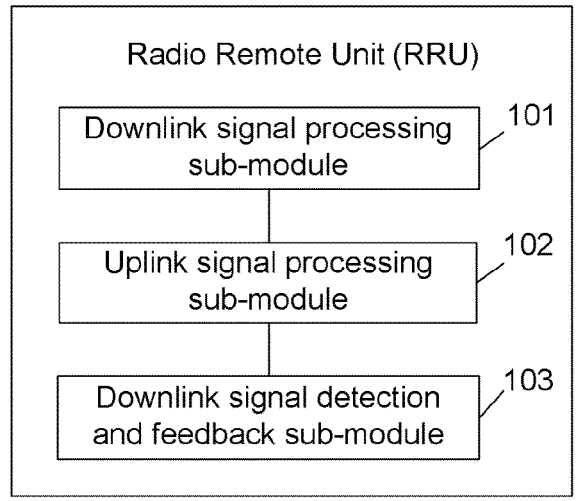
FIG. 12 is a schematic structural diagram of a RRU according to an embodiment of the disclosure.

Turning to FIG. 12, FIG. 12 is a schematic structural diagram of a RRU according to an embodiment of the disclosure.

The RRU provided by the embodiment of the disclosure includes the following sub-modules.

A downlink signal processing sub-module 101 is configured to obtain the downlink intermediate frequency analog signal from the Ethernet cable, convert the downlink intermediate frequency analog signal into a downlink radio frequency signal, and output the converted downlink radio frequency signal through a port of an antenna.

An uplink signal processing sub-module 102 is configured to receive the feedback uplink radio frequency signal from the port of the antenna, convert it to the uplink intermediate frequency analog signal and output it to the Ethernet cable.

A downlink signal detection and feedback sub-module 103 is configured to detect the downlink radio frequency signal, performing down conversion on the detected downlink radio frequency signal to obtain the uplink intermediate frequency analog signal and output it to the Ethernet cable.

The downlink intermediate frequency analog signal transmitted by the EIP device to the Ethernet cable is transmitted through the port of the Ethernet cable. The downlink signal processing sub-module 101 of the RRU receives the downlink intermediate frequency analog signal from the corresponding port and processes the downlink intermediate frequency analog signal and then outputs to the corresponding antenna.

According to this embodiment, in the uplink, the uplink signal processing sub-module 102 of the RRU receives the uplink radio frequency signal fed back according to the downlink intermediate frequency analog signal from the port of the antenna, converts it to the uplink intermediate frequency analog signal and outputs it to the Ethernet cable. At the same time, the downlink signal detection and feedback sub-module 103 of the RRU performs the coupling detection on the radio signal amplified by the power amplifier and down converts the radio signal which is subject to the coupling detection so as to convert it into the uplink intermediate frequency analog signal and then outputs the uplink intermediate frequency analog signal to the corresponding port of the Ethernet cable for transmission.

Figure 13:
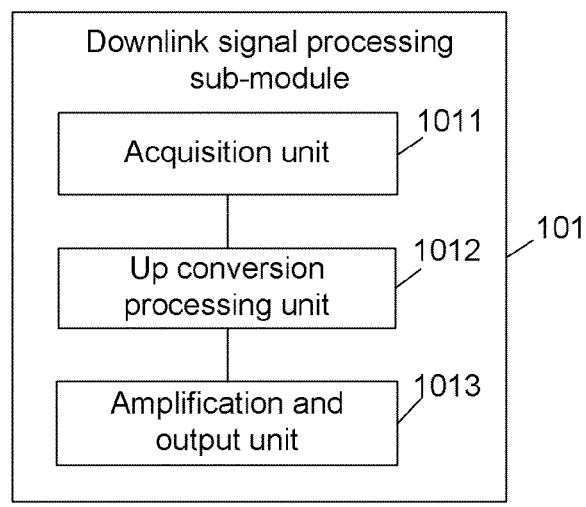
FIG. 13 is a schematic structural diagram of the downlink signal processing sub-module of the RRU according to an embodiment of the disclosure.

Turning to FIG. 13, FIG. 13 is a schematic structural diagram of the downlink signal processing sub-module of the RRU according to an embodiment of the disclosure.

In the above embodiment, the downlink signal processing sub-module 101 includes the following units.

An acquisition unit 1011 is configured to obtain the downlink intermediate frequency analog signal which is filtered by the band-pass filter from the Ethernet cable.

An up conversion processing unit 1012 is configured to up convert the filtered downlink intermediate frequency analog signal so as to convert it to the downlink radio frequency signal.

An amplification and output unit 1013 is configured to amplify the downlink radio frequency signal via the power amplifier, filter the amplified downlink radio frequency signal via the duplexing filter and output it to the port of the antenna.

The downlink intermediate frequency analog signal transmitted by the EIP device to the Ethernet cable is transmitted through the port of the Ethernet cable. The downlink intermediate frequency analog signal is filtered by the band-pass filter and obtained by the acquisition unit 1011 from the Ethernet cable. Then, the up conversion processing unit 1012 performs up conversion on the filtered downlink intermediate frequency analog signal so as to convert it to the downlink radio frequency signal. Finally, the amplification and output unit 1013 amplifies the downlink radio frequency signal via the power amplifier, filter the amplified downlink radio frequency signal via the duplexing filter and output it to the port of the antenna.

Based on the RRU according to the embodiment of the present disclosure, the uplink signal processing sub-module 102 is further configured to receive the feedback uplink radio frequency signal from the port of the antenna, convert it to the uplink intermediate frequency analog signal via filtering, low noise amplification and down conversion by the duplexing filter and output it to the Ethernet cable.

The uplink signal processing sub-module 102 of the RRU receives the uplink radio frequency signal fed back according to the downlink intermediate frequency analog signal from the port of the antenna, convert it to the uplink intermediate frequency analog signal and output it to the Ethernet cable. Specifically, after the uplink radio frequency signal fed back is received, it is performed by filtering and low noise amplification by the duplexing filter and then is down converted to the uplink intermediate frequency analog signal. Finally, the processed the uplink intermediate frequency analog signal is outputted to the Ethernet cable.

Figure 14:
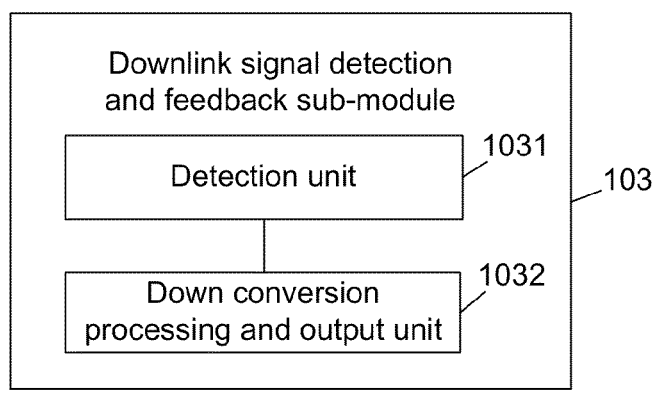
FIG. 14 is a schematic structural diagram of the downlink signal detection and feedback sub-module of the RRU according to an embodiment of the disclosure.

Turning to FIG. 14, FIG. 14 is a schematic structural diagram of the downlink signal detection and feedback sub-module of the RRU according to an embodiment of the disclosure.

The downlink signal detection and feedback sub-module 103 includes the following units.

A detection unit 1031 is configured to detect the downlink radio frequency signal which is amplified by the power amplifier.

A down conversion processing and output unit 1032 is configured to down convert the detected downlink radio frequency signal to the uplink intermediate frequency analog signal and output it to the Ethernet cable.

After the RRU obtains the downlink radio frequency signal from the Ethernet cable, the downlink signal detection and feedback sub-module 103 of the RRU performs the coupling detection on the radio signal amplified by the power amplifier. That is, the detection unit 1031 detects the downlink radio frequency signal which is amplified by the power amplifier and then the down conversion processing and output unit 1032 down converts the detected downlink radio frequency signal to the uplink intermediate frequency analog signal and output it to the corresponding port of the Ethernet cable for transmission.

Figure 15:
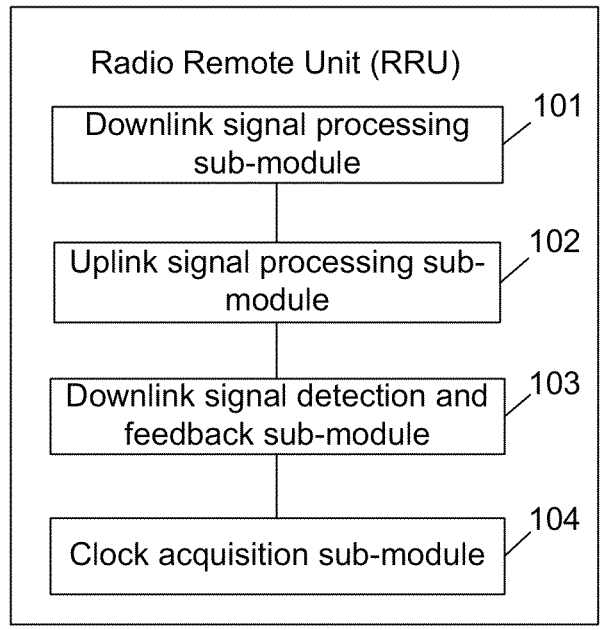
FIG. 15 is another schematic structural diagram of the RRU according to an embodiment of the present disclosure.
Figure 16:
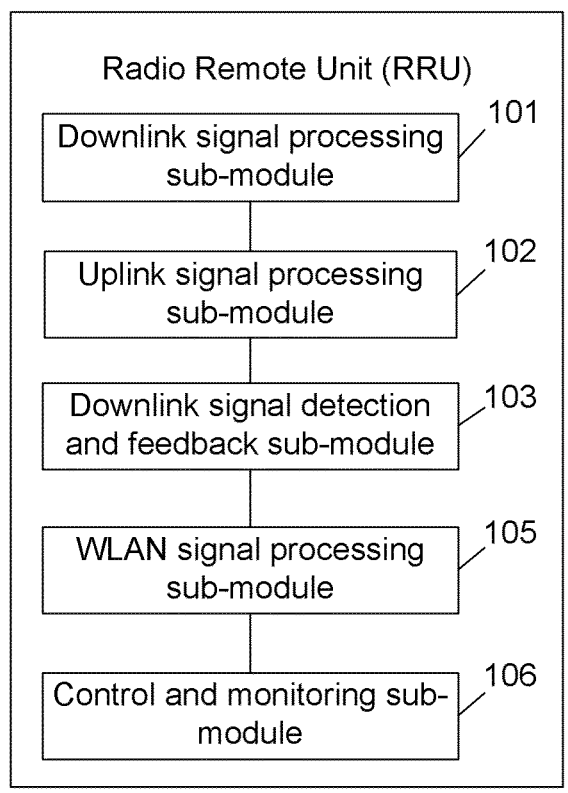
FIG. 16 is still another schematic structural diagram of the RRU according to an embodiment of the present disclosure.
Figure 17:
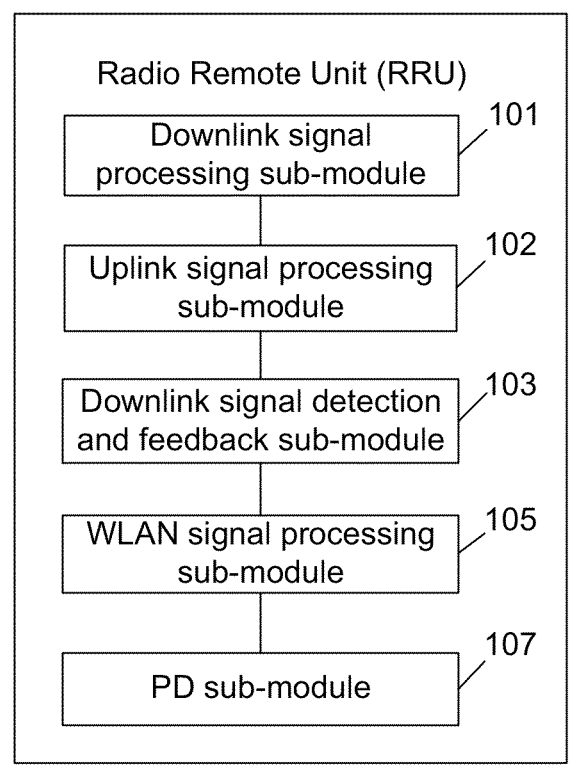
FIG. 17 is yet another schematic structural diagram of the RRU according to an embodiment of the present disclosure.

Turning to FIGS. 15-17, FIG. 15 is another schematic structural diagram of the RRU according to an embodiment of the present disclosure; FIG. 16 is still another schematic structural diagram of the RRU according to an embodiment of the present disclosure, and FIG. 17 is yet another schematic structural diagram of the RRU according to an embodiment of the present disclosure.

Based on the RRU according to an embodiment of the present disclosure, the RRU further includes the following sub-modules.

A clock acquisition sub-module 104 is configured to obtain a reference clock signal by filtering the downlink intermediate frequency analog signal obtained from the Ethernet cable by the band-pass filter and output the reference clock signal to a phase-locked loop.

A WLAN signal processing sub-module 105 is connected to the Ethernet switching module inside and configured to process the uplink and downlink WIFI signals.

A control and monitoring sub-module 106 is connected to the Ethernet switching module inside and configured to maintain, control and monitor the RRU.

A PD sub-module 107 is configured to extract the current and voltage from the Ethernet cable and supply power for all the active devices of the RRU.

After the EIP device receives the downlink base band signal transmitted from the BBU and caches it in the base band data transceiver processing and RRU monitoring module, the clock signal is extracted from the downlink base band signal and is outputted to the corresponding port of the Ethernet cable for transmission. The RRU receives the clock signal from the port of the Ethernet cable via the clock acquisition sub-module 104 and obtains the reference clock signal by filtering the clock signal via the band-pass filter. The reference clock signal is finally outputted into the phase-locked loop, which in turn provides a reference clock for the active devices in the RRU.

the WLAN signal processing sub-module 105 connected to the Ethernet switching module inside and configured to process the uplink and downlink WIFI signals; and the control and monitoring sub-module 106 configured to maintain, control and monitor the RRU.

The RRU further includes the PD sub-module 107 configured to extract the current and voltage from the Ethernet cable and supply power for all the active devices of the RRU.

The above is only the preferred embodiments of the present disclosure and is not intended to limit the protection scope of the present disclosure. The equivalent various changes to the structures or the flowcharts according to the specification and accompanying figures or application to the other related technology fields should be included in the protection scope of the present disclosure.

Industrial Application

According to an embodiment of the present disclosure, an Ethernet signal+an intermediate frequency signal+power over Ethernet (EIP) device receives a downlink base band signal transmitted by a base band processing unit (BBU), processes the downlink base band signal to module the downlink base band signal into a downlink intermediate frequency analog signal, and outputs the downlink intermediate frequency analog signal to an Ethernet cable. Then, an uplink intermediate frequency analog signal is obtained from the Ethernet cable, which is detected and fed back by a Radio Remote Unit (RRU) according to the downlink radio frequency analog signal, and the uplink intermediate frequency analog signal is processed. The processed uplink intermediate frequency analog signal is taken as a feedback input of digital pre-distortion (DPD). The uplink intermediate frequency analog signal is obtained from the Ethernet cable, and converted into an uplink base band signal, and then transmitted to the BBU. As such, the transmission of the wireless band base signal between the BBU and the RRU is implemented by the EIP device, therefore avoiding the high cost of the network deployment caused by re-laying the optical fiber or microwave transmission network.

What is claimed is:

1. A method for transmitting wireless base band data, comprising:
    receiving a downlink base band signal transmitted by a Base Band Unit (BBU), processing the downlink base band signal to modulate it to a downlink intermediate frequency analog signal and outputting the downlink intermediate frequency analog signal to an Ethernet cable;
    detecting, on the Ethernet cable, a fed back uplink intermediate frequency analog signal and processing the uplink intermediate frequency analog signal; and
    taking the processed uplink intermediate frequency analog signal as a feedback input of Digital PreDistortion (DPD), obtaining an intermediate frequency analog signal from the Ethernet cable, converting the obtained intermediate frequency analog signal into an uplink base band signal and outputting it to the BBU.

2. The method according to claim 1, wherein the uplink intermediate frequency analog signal is obtained by performing, by a Radio Remote Unit (RRU), up conversion on the downlink intermediate frequency analog signal obtained from the Ethernet cable so as to obtain a radio frequency signal, amplifying the radio frequency signal, detecting the amplified radio frequency signal so as to obtain the detected radio frequency signal and performing down conversion on the detected radio frequency signal.

3. The method according to claim 2, wherein the step of processing the downlink base band signal to modulate it to the downlink intermediate frequency analog signal comprises:
    performing digitalized up conversion on the downlink base band signal so as to convert it to the downlink intermediate frequency digital signal; and
    performing peak clipping, digital pre-distortion and digital-to-analog conversion on the downlink intermediate frequency digital signal to modulate it to the downlink intermediate frequency analog signal.

4. The method according to claim 1, wherein the step of taking the processed uplink intermediate frequency analog signal as the feedback input of DPD, obtaining the intermediate frequency analog signal from the Ethernet cable, and converting the intermediate frequency analog signal into the uplink base band signal comprises:
    filtering the uplink intermediate frequency analog signal by a band-pass filter and performing analog-to-digital conversion on the filtered uplink intermediate frequency analog signal so as to obtain the uplink intermediate frequency digital signal; and
    performing down conversion on the uplink intermediate frequency digital signal to convert it to the uplink base band signal.

5. The method according to claim 1, wherein after receiving the downlink base band signal transmitted by the BBU, the method further comprises:
    extracting a clock signal from the downlink base band signal and outputting it to the Ethernet cable so that a RRU obtains a reference clock signal by filtering the clock signal via a band-pass filter and outputs the reference clock signal to a phase-locked loop after the RRU receives the clock signal.

6. The method according to claim 5, wherein when the step of receiving the downlink base band signal transmitted by the BBU is performed, the method further comprises:
    receiving an Ethernet signal transmitted via the Ethernet and outputting it to the Ethernet cable so that the RRU receives the Ethernet signal from the Ethernet cable, performs Ethernet switching and outputs via an interface of a wireless local network.

7. An apparatus for transmitting wireless base band data, comprising:
    a downlink base band signal processing module configured to receive a downlink base band signal transmitted by a Band Base Unit (BBU), process the downlink base band signal to modulate it to a downlink intermediate frequency analog signal and output the downlink intermediate frequency analog signal to an Ethernet cable;
    an uplink intermediate frequency analog signal detecting and processing module configured to detect, on the Ethernet cable, a fed back uplink intermediate frequency analog signal and process the uplink intermediate frequency analog signal;

an uplink base band signal generation module configured to take the processed uplink intermediate frequency analog signal as a feedback input of Digital PreDistortion (DPD), obtain an intermediate frequency analog signal from the Ethernet cable, and convert the intermediate frequency analog signal into an uplink base band signal; and an uplink base band signal transmission module configured to transmit the uplink base band signal to the BBU.

8. The apparatus according to claim 7, wherein the uplink intermediate frequency analog signal detected by the uplink intermediate frequency analog signal detecting and processing module is obtained by performing, by a Radio Remote Unit (RRU), up conversion on the downlink intermediate frequency analog signal obtained from the Ethernet cable so as to obtain a radio frequency signal, amplifying the radio frequency signal, detecting the amplified radio frequency signal so as to obtain the detected radio frequency signal and performing down conversion on the detected radio frequency signal.

9. The apparatus according to claim 7, wherein the downlink base band signal processing module comprises:
an up conversion processing unit configured to perform digitalized up conversion on the downlink base band signal so as to convert it to the downlink intermediate frequency digital signal; and
a modulation unit configured to perform peak clipping, digital pre-distortion and digital-to-analog conversion on the downlink intermediate frequency digital signal to modulate it into the downlink intermediate frequency analog signal.

10. The apparatus according to claim 7, wherein the uplink base band signal generation module comprises:
an uplink intermediate frequency digital signal generation unit configured to filter the uplink intermediate frequency analog signal by a band-pass filter and perform analog-to-digital conversion on the filtered uplink intermediate frequency analog signal so as to obtain the uplink intermediate frequency digital signal; and
a down conversion processing unit configured to perform down conversion on the uplink intermediate frequency digital signal to convert it to the uplink base band signal.

11. The apparatus according to claim 7, wherein the apparatus further comprises:
a clock signal extraction and output module configured to extract a clock signal from the downlink base band signal and output it to the Ethernet cable so that a RRU obtains a reference clock signal by filtering the received clock signal via a band-pass filter and outputs the reference clock signal to a phase-locked loop after the RRU receives the clock signal.

12. The apparatus according to claim 11, wherein the apparatus further comprises:
an Ethernet signal output module configured to receive an Ethernet signal transmitted via the Ethernet and output it to the Ethernet cable so that the RRU receives the Ethernet signal from the Ethernet cable, performs Ethernet switching and outputs via an interface of a wireless local network.

13. The apparatus according to claim 7, wherein the apparatus further comprises:
a Power Sourcing Equipment (PSE) and Ethernet switching module configured to supply current and voltage for the Ethernet cable and supply power for a RRU at the remote end.

14. A Radio Remote Unit (RRU), comprising:
a downlink signal processing sub-module configured to obtain a downlink intermediate frequency analog signal from an Ethernet cable, convert the obtained downlink intermediate frequency analog signal into a downlink radio frequency signal, and output the downlink radio frequency signal through a port of an antenna;
an uplink signal processing sub-module configured to receive a fed back uplink radio frequency signal from the port of the antenna, convert it to an uplink intermediate frequency analog signal and output the uplink intermediate frequency analog signal to the Ethernet cable; and
a downlink signal detection and feedback sub-module configured to detect the downlink radio frequency signal, perform down conversion on the detected downlink radio frequency signal to obtain the uplink intermediate frequency analog signal and output it to the Ethernet cable.

15. The RRU according to claim 14, wherein the downlink signal processing sub-module comprises:
an acquisition unit configured to obtain the downlink intermediate frequency analog signal, which is filtered by a band-pass filter, from the Ethernet cable;
an up conversion processing unit configured to perform up conversion on the filtered downlink intermediate frequency analog signal so as to convert it to the downlink radio frequency signal; and
an amplification and output unit configured to amplify the downlink radio frequency signal via a power amplifier, filter the amplified downlink radio frequency signal via a duplexing filter and output it to the port of the antenna.

16. The RRU according to claim 15, wherein the uplink signal processing sub-module is further configured to receive the fed back uplink radio frequency signal from the port of the antenna, convert it to the uplink intermediate frequency analog signal via filtering by a duplexing filter, low noise amplification and down conversion and output the uplink intermediate frequency analog signal to the Ethernet cable.

17. The RRU according to claim 16, wherein the downlink signal detection and feedback sub-module comprises:
a detection unit configured to detect the downlink radio frequency signal which is amplified by the power amplifier; and
a down conversion processing and output unit configured to perform down conversion on the detected downlink radio frequency signal so as to obtain the uplink intermediate frequency analog signal and output the uplink intermediate frequency analog signal to the Ethernet cable.

18. The RRU according to claim 14, wherein the RRU further comprises:
a clock acquisition sub-module configured to obtain a reference clock signal by filtering the downlink intermediate frequency analog signal obtained from the Ethernet cable by a band-pass filter and output the reference clock signal to a phase-locked loop.

19. The RRU according to claim 18, wherein the RRU further comprises:
a Wireless Local Area Network (WLAN) signal processing sub-module connected to an internal Ethernet switching module and configured to process an uplink and downlink Wireless Fidelity (WIFI) signals; and
a control and monitoring sub-module connected to the internal Ethernet switching module and configured to maintain, control and monitor the RRU.

20. The RRU according to claim 19, wherein the RRU further comprises:
a Powered Device (PD) sub-module configured to extract a current and voltage from the Ethernet cable and supply power for all active devices of the RRU.

\* \* \* \* \*